Aug. 10, 1948.  E. FIDDYMENT  2,446,752
MATERIAL FEEDING DEVICE
Filed July 31, 1945

INVENTOR
Earl Fiddyment
BY J. Stanley Churchill
ATTORNEY

Patented Aug. 10, 1948

2,446,752

UNITED STATES PATENT OFFICE 2,446,752

MATERIAL FEEDING DEVICE

Earl Fiddyment, North Quincy, Mass., assignor to Pneumatic Scale Corporation, Limited, Quincy, Mass., a corporation of Massachusetts Application July 31, 1945, Serial No. 608,015

1 Claim. (Cl. 198—56)

This invention relates to a material feeding device.

The invention has for an object to provide a novel and improved material feeding device particularly adapted for feeding coarse, lumpy or irregular shaped materials and in which provision is made for agitating the material to prevent clogging or jamming thereof whereby a substantially uniform flow of such materials may be obtained.

With this general object in view and such others as may hereinafter appear, the invention consists in the material feeding device and in the various structures, arrangements and combinations of parts hereinafter described and particularly defined in the claim at the end of this specification.

Figure 2:
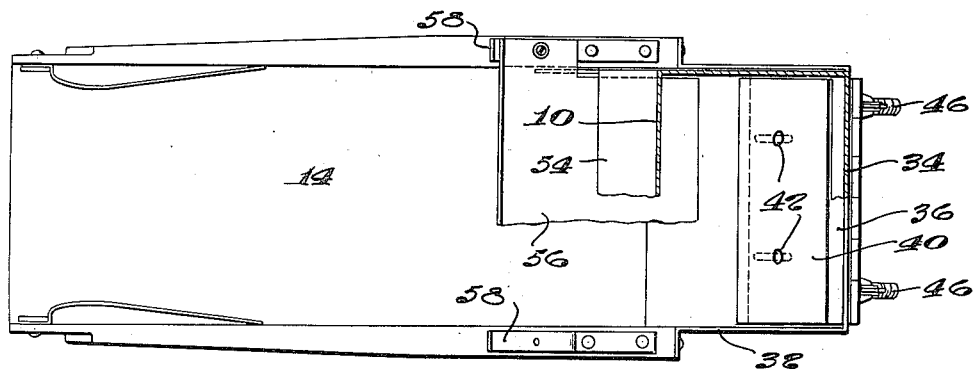
Figure 1:
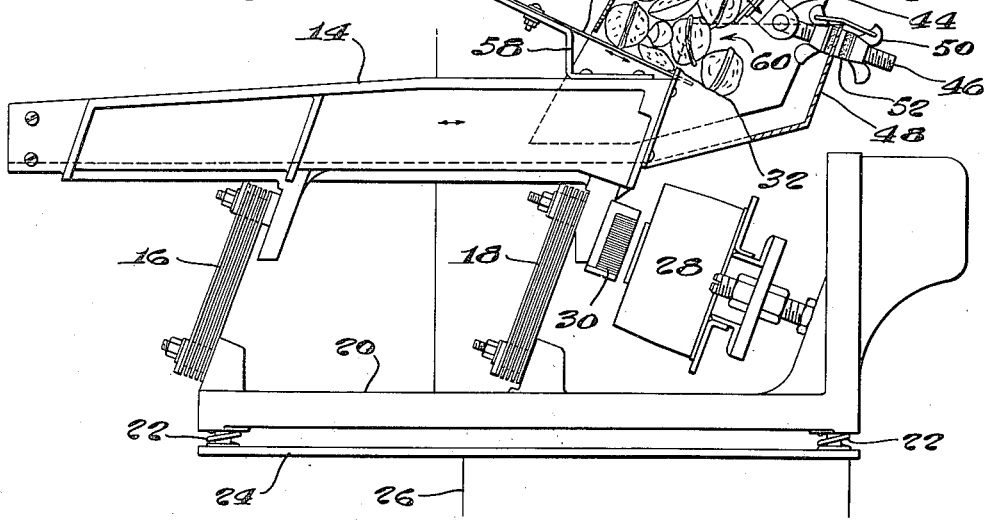

In the drawings illustrating the preferred embodiment of the invention, Fig. 1 is a side elevation, partly in cross section, of a material feeding device embodying the present invention; and Fig. 2 is a plan view of the same with some of the parts broken away and shown in cross section.

In general, the present invention contemplates a material feeding device which may be used with advantage in a weighing machine for feeding a substantially uniform stream of material to a weighing receptacle, and, which is particularly adapted for feeding coarse, lumpy, irregular shaped materials including mixed nuts, lump sugar, elbow macaroni and the like in a manner such as to prevent clogging or jamming thereof in the device and thus facilitating the maintenance of a constant and substantially uniform flow of such materials to the weighing receptacle.

To this end, the present feeding device includes a supply hopper arranged to feed the coarse material by gravity to a vibratory conduit and, in accordance with the present invention, provision is made for agitating the material at the throat of the supply hopper through connections from the vibratory conduit to keep the material in a loose and flowable condition and thus assure a free flow thereof from the supply hopper into the vibratory conduit. Upon release of the material from the supply hopper, the vibratory conduit is arranged to effect feeding of the material in a substantially uniform stream for delivery to a weighing receptacle or the like.

Referring now to the drawings, 10 represents a stationary supply hopper in which the bulk material 12, herein shown as mixed nuts, is stored and from which the material is fed by gravity into one end of a horizontally disposed vibratory conduit 14 arranged to deliver the material in a substantially uniform stream at the other end thereof to be received in a weighing receptacle or other container. As herein shown, the vibratory conduit 14 comprises an elongated trough or chute supported intermediate its ends by flexible angularly arranged straps 16, 18 connected to a base member 20 which is mounted on shock absorbing springs 22 interposed between the base and a supporting plate 24 attached to the machine frame 26. The conduit 14 may be vibrated through any usual or preferred means, herein shown as an electrically operated vibratory motor 28 attached to the base member 20 and having an armature 30 secured to the conduit 14.

As herein illustrated, the receiving end of the horizontally disposed vibratory conduit 14 is provided with an angularly extended portion forming an inclined chute 32 into which the material is arranged to fall from the mouth of the hopper to be carried forward into the main part of the conduit and thereafter discharged from the delivery end thereof. In order to assure a free flow of the coarse material from the mouth of the rigidly supported hopper 10 into the vibratory conduit, the lower portion of the rear wall 34 of the hopper comprises a hinged plate 36 pivoted at 38 at its upper end and provided with an adjustable portion 40 secured to the plate by bolts 42. The lower end of the hinged plate 36 is provided with a pair of connecting members 44 arranged to receive the ends of bolts 46 adjustably secured to the rear wall 48 of the extended chute 32. As herein shown, the bolts 46 may be secured by wing nuts 50 provided with suitable washers 52. Thus, in operation, during the vibratory movement of the conduit 14, the hinged plate 36 is rocked or vibrated to avoid any tendency of the material to choke or clog the throat thereof.

The hinged plate 36 is preferably disposed at an inwardly inclined angle and the lower front portion of the hopper extends outwardly at a somewhat similar angle forming an offset portion 54 arranged to guide the material to the left viewing Fig. 1. Cooperating with the hinged plate 36 is a second vibratory plate 56 supported by brackets 58 attached to the sides of the vibratory conduit 14. As herein shown, the second vibratory plate 56 is disposed transversely of the end of the offset portion 54 and approximately at right angles to the end of the lower front portion of the hopper forming an inclined bottom wall arranged to guide the material to the right through an opening 60 formed between the inner end of the vibratory plate 56 and the lower end of the hinged plate 36, from which opening the material falls into the extended chute portion 32 of the vibratory conduit 14. Thereafter, during the vibratory movement of the conduit, the material is urged to left, passing under the inner end of the second vibratory plate 56 and into the main portion of the vibratory conduit 14.

From the above description, it will be seen that, in operation, the material at the throat of the hopper is vibrated and agitated through connections from the vibratory conduit whereby to prevent arching or clogging of the material and to effect emergence of a substantially uniform flow from the hopper.

While the preferred embodiment of the invention has been herein illustrated and described it will be understood that the invention may be embodied in other forms within the scope of the following claim.

Having thus described the invention, what is claimed is:

A material feeding device for coarse material comprising a substantially horizontal vibratory feeding conduit, a non-vibratory supply hopper mounted above and independently of the vibratory feeding conduit and having a downwardly extended delivery conduit terminating above, and in a position to discharge the material into, the rear end of the vibratory feeding conduit, the rear end of the delivery conduit being provided with a steeply inclined and forwardly extending plate hinged thereto, and adjusting means connecting the hinged plate and the rear end of the horizontal vibratory feeding conduit for transmitting to the plate vibrations from the vibratory feeding conduit whereby to effect forward movement of, and to assist in the downward movement of, material passing thereover in its descent through the delivery conduit, and a second plate carried by the vibratory feeding conduit and arranged to extend angularly rearwardly and spaced a short distance below the forward wall of said delivery conduit and at a substantial distance below the forward end of the hinged plate whereby the material moved by the vibrations of said hinged plate may subsequently fall by gravity into engagement with said second plate to be moved by its vibrations rearwardly under the end of said hinged plate to be discharged into the rear end of the vibratory feeding conduit, said cooperating vibratory plates imparting vibration to the lower portion only of the column of material within the delivery conduit and the supply hopper.

EARL FIDDYMENT.

REFERENCES CITED

The following references are of record in the file of this patent:

UNITED STATES PATENTS

| Number | Name | Date |
| --- | --- | --- |
| 447,072 | Huntley | Feb. 24, 1891 |
| 804,022 | May | Nov. 7, 1905 |
| 2,031,369 | Holbeck | Feb. 18, 1936 |
| 2,098,034 | Flint et al. | Nov. 2, 1937 |
| 2,329,984 | Drake et al. | Sept. 21, 1943 |
| 2,333,435 | Muskat | Nov. 2, 1943 |
| 2,340,190 | Kohout | Jan. 25, 1944 |